Figure 1:
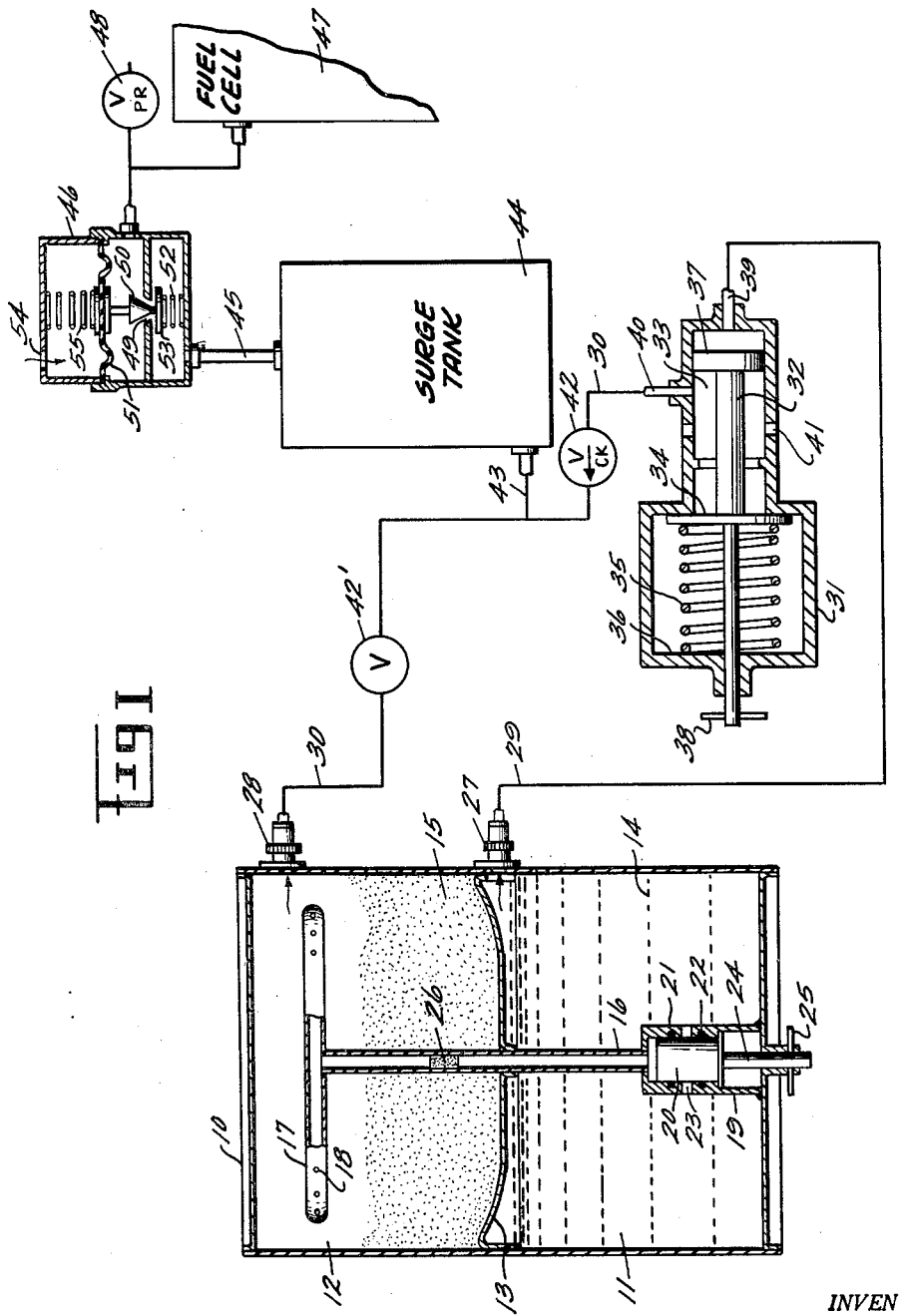

Dec. 1, 1964  R. E. SALATHE  3,159,506
GASEOUS FUEL GENERATOR FOR FUEL CELLS
Filed March 31, 1961  2 Sheets-Sheet 2

INVENTOR.
ROBERT E. SALATHE
BY
ATTORNEY—

3,159,506
GASEOUS FUEL GENERATOR FOR FUEL CELLS
Robert Edward Salathe, Reading, Mass., assignor to General Electric Company, a corporation of New York
Filed Mar. 31, 1961, Ser. No. 99,859
6 Claims. (Cl. 136—86)

This invention relates to gaseous fuel generators for fuel cells and more particularly to an improved gaseous fuel generator for supplying fuel gas in response to the demands of a fuel cell.

Fuel cells utilizing gaseous fuels are well known in the art and are typified for example by United States Patent 2,913,511 to Willard T. Grubb, Jr., entitled, "Fuel Cells," which was issued November 17, 1959, and assigned to the assignee of the present application. According to this patent an ion exchange resin membrane is placed between and in contact with a pair of permeable electrodes, one of which is exposed to an oxidant, such as oxygen or air, and the other to a fuel gas; as for example, hydrogen. In the case of a cationic membrane, ionization of the fuel gas occurs at the anode and migration of the electrons takes place between the electrically connected electrodes to establish an electric current. The positively charged ions then migrate through the membrane to combine with the oxidant and free electrons at the cathode.

The rate of consumption of fuel gas by the cell depends upon the rate of electric current generation, or current density over the surface of the membrane, and the density, or pressure at a given temperature, of the fuel gas in the cell, therefore, also depends upon the rate of current generation. In order to maintain a current as required by a fixed or varying external load, it is necessary to maintain a rate of fuel gas supply to the fuel cell sufficient to offset a decrease in density of varying rate caused by a varying consumption rate of fuel by the cell.

A convenient supply of fuel gas for a fuel cell is, for example, a generator comprising means for mixing suitable reactants at a controlled rate. Such a system is described in the co-pending application of William A. Titterington et al., filed on December 23, 1959, Serial No. 861,704, now Patent No. 3,098,768, also assigned to the assignee of the present application. The co-pending application provides a hydrogen generation system based on gravity feed of, for example, an acid solution on to a hydride or borohydride. Reliable efficiency of such a system based on a theoretical chemical yield of hydrogen gas is in the order of fifty to sixty percent. This results in excessive chemical and system weight and size for a given total hydrogen generation. Then too, a gravity feed system, as described therein, is subject to clogging due to the corrosive character of the reactants.

It is, therefore, an object of the present invention to provide a gaseous fuel generator having improved gas-generating efficiency.

It is a further object of this invention to provide a gaseous fuel generator which is operative to supply fuel gas for a fuel cell responsive to the fuel consumption rate of the cell.

Yet another object of the present invention is to provide a gaseous fuel generator of improved operating reliability.

In accordance with the present invention there is provided a first chamber containing a liquid reactant. A second chamber, contiguous to the first chamber, is provided which contains a reactant capable of reacting with the liquid reactant to produce a gaseous fuel for the fuel cell. The second chamber is maintained generally at a pressure less than the pressure within the first chamber. Means responsive to the fuel consumption of the cell provides a periodic feed of the liquid reactant to the second chamber for producing the fuel.

Briefly stated, the invention is practiced in one embodiment thereof by placing a surge tank in serial fluid flow relation between the fuel generator and the fuel cell. Means is provided for controlling the flow of gas from the surge tank to the fuel cell in response to the pressure obtained in a fuel gas chamber of the fuel cell. The gas flow is controlled in such a manner as to maintain a preselected pressure range in the fuel gas chamber, although the fuel cell exhibits a varying fuel consumption rate. A fuel gas generator is provided for supplying fuel gas to the surge tank. One form of such a generator is a cannister containing fuel gas-generating reactants in chambers separated by a partition. A first such chamber contains a liquid reactant, such as an acid, and a second chamber contains a reactant, such as a borohydride, capable of reacting with the acid to produce hydrogen fuel. Periodic feed of the acid from the first chamber to the borohydride in the second chamber is provided by means responsive to the fuel consumption rate of the fuel cell.

Figure 2:
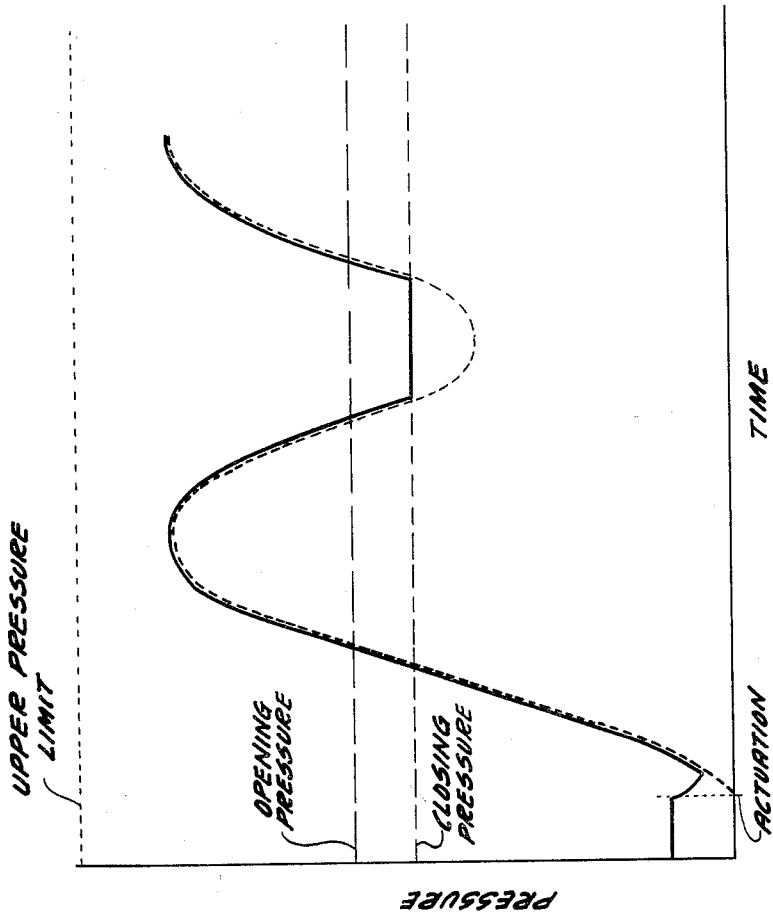

While the specification concludes with claims particularly pointing out and distinctly claiming the subject matter which is regarded as the invention, it is believed that the invention will be better understood from the following description taken in connection with the accompanying drawings in which:

FIGURE 1 is a schematic representation of a gaseous fuel generating system for a fuel cell, according to a preferred embodiment of the invention; and FIGURE 2 is a graph illustrating the operating characteristics of the fuel gas generator shown in FIGURE 1.

Referring now to FIGURE 1, there is provided a gaseous generator in the form of a cannister 10 having chambers 11 and 12 separated by a dividing partition 13. The chamber 11 contains a liquid reactant 14 as, for example, sulphuric acid. The compartment 12 contains a reactant 15 capable of reacting with the liquid 14 to produce a gaseous fuel suitable for use in a fuel cell. The reactant 15 is, for example cobalt chloride and sodium borohydride which will react with the sulphuric acid to produce hydrogen gas. Within the cannister 10 is a tube 16 passing through the partition 13. In the chamber 12 the tube 16 terminates in a shower head 17 having orifices 18 therein. In the chamber 11 the tube 16 terminates in a portion of enlarged cross-sectional area 19 having disposed therein a piston 20. The piston 20 provides a fluid seal by means of O rings 21 and 22. In the walls of enlarged portion 19 is an orifice 23 which may be located at a suitable point near the bottom of the cannister 10. For movement of the piston 20 there is provided a plunger 24 connected to a handle 25. To remove fully the liquid 14, a recession or sump (not shown) may be provided in the base of the cannister so that the piston 20 may be pulled down therein. This would permit the orifice 23 to be at the very bottom of the enlarged portion 19.

Located within the tube 16 is a porous plug 26 which provides a resistance to the flow fluid therethrough and causes a pressure drop thereacross.

The cannister 10 is further provided with quick disconnect fittings 27 and 28 communicating with chambers 11 and 12 respectively. These fittings 27 and 28 may be provided with frangible diaphragms thereacross so that the reactants stored therein will be unaffected by ambient conditions prior to use. When incorporated as part of the system, the cannister 10 is connected to the lines 29 and 30 which are, for example, provided with means for piercing the diaphragms in the fittings 27 and 28 to establish communication with the interior of the chambers 11 and 12.

Connected to the fitting 27 is the line 29 which establishes communication between the fitting 27 and a high pressure relief valve 31. The high pressure relief valve 31 is provided with a piston 32 positioned for movement within the cylinder 33. The piston 32 has a shoulder 34 upon which is seated bias spring 35. The spring is in turn seated against the rear housing 36 of the valve 31.

The piston 32 is moved by pressure exerted on the piston face 37. The piston may be moved manually by means of the handle 38.

The valve 31 has an inlet port 39 communicating with the line 29. The valve 31 has outlet ports 40 and 41 communicating with the line 30 and the atmosphere respectively.

The port 40 thereby selectively communicates with the chamber 12 through check valve 42 and manual shut-off valve 42'. Extending from the line 30 is the line 43 which communicates with the surge tank 44. The surge tank 44 communicates through a line 45 with the control valve 46 which regulates the fuel gas pressure in the fuel cell 47. In parallel with the fuel cell 47 is the pressure relief valve 48 which serves to prevent excessive pressure buildup within the fuel cell 47. The control valve 46 comprises a flow control orifice 49 sized to receive the conical valve body 50. The valve body 50 is secured between the membrane 51 and bias spring 52 which is tensioned between the housing of control valve 46 and a disc portion 53 of the conical valve body 50. The membrane 51 is exposed to the atmosphere on one side by means of the orifice 54 in the housing of the valve 46. The membrane 51 is tensioned between the bias spring 55 and the conical valve body 50.

*Operation*

Operation of the gaseous fuel generator commences when the piston 20, the actuation means, is pulled down below the level of the orifice 23. This permits flow of the liquid 14 up the tube 16 as a result of pre-pressurization of the chamber 11. Acid passing up the tube 16 flows through the porous plug 26 into the shower head 17 and through the orifices 18.

When the acid contacts the reactant 15 and hydrogen gas is thereby produced, the gas flows through the lines 30 and 43 into the surge tank 44. If the fuel cell 47 is not connected to a load such that fuel is consumed, pressure within the surge tank 44 will build up to the point where pressure within the chamber 12 equals that within the chamber 11. When this occurs, flow of the liquid reactant 14 will cease, terminating generation of the fuel gas. Any excess pressure in the chamber 12 then results in passage of the gas into the shower head 17 down the tube 16 and into the chamber 11 where it will bubble through the liquid reactant 14 and remain thereabove.

In the event that fuel gas pressure within the chamber 11 begins to build up excessively, the gas will pass through the line 29 into the relief valve 31 through the port 39. If the pressure is sufficiently great to move the piston 32 to expose the port 40, the gas will begin to pass into the line 30 through the check valve 42 and then in parallel to the surge tank 44 and chamber 12. Such a feedback of the fuel gas is intended to prevent a loss of gas from the system while keeping the system pressure within safe limits. If, however, sufficiently high pressures within the system are attained, the piston 32 of the valve 31 will be moved back beyond the port 41 where the fuel gas will vent to the atmosphere until a safe pressure is attained.

When a load is placed on the cell 47, fuel is consumed and the pressure within the cell compartment sensed by the control valve 46 begins to drop. As the fuel gas pressure within the cell begins to drop the conical valve 50 unseats and fuel gas passes from the surge tank 44 through the line 45 into the control valve 46 where it passes out into the fuel cell 47. Since excessive pressure within the fuel compartment of the cell 47 may rupture the ion exchange membrane (not shown), the pressure relief valve 48 is provided in the event of failure of the control valve 46.

Referring now to FIGURE 2, there is here shown a graphic illustration of the operating characteristics of the fuel gas generator embodiment illustrated in FIGURE 1. In this illustration, pressure is plotted on the ordinate and time on the abscissa. The curve shown as a dashed line represents the pressure-time plot characterizing the chamber 12, whereas the curve illustrated by the solid line shows the pressure-time characteristics of the chamber 11. The upper limit pressure designates that pressure at which relief valve 31 permits the fuel gas to vent to the atmosphere. The dashed lines designating opening and closing pressure refer to the opening and closing pressures of the relief valve 31 which permits feedback of the gas in chamber 11 through the line 29 into the valve 31 and out through the orifice 40 into the line 30. The difference between these pressures is due to friction of the piston and hysteresis.

When the generator is activated there is a momentary drop in pressure within the chamber 11 as indicated by the dip in the solid line plot of FIGURE 2 following the point labelled "actuation." Upon actuation there is a build up of pressure within the chamber 12 as indicated by the ascent of the dashed line. The maximum pressure build up determines the amplitude of the curves which in turn is a function of the time constant of the chemical reaction as well as the amount of acid fed per cycle, the latter being proportional to the size of the orifices 18, in the embodiment of FIGURE 1, for example.

The pressure decay rate, shown as a negative slope on the curves, is a function of the cell load, which determines the fuel consumption rate. Shortly after the pressure has decayed to the point where the relief valve 31 closes, acid feed to the chamber 12 again commences and a new cycle begins. It is to be particularly noted that during this period the chamber 11 is maintained at a higher pressure than the chamber 12, thereby providing a pressurized flow of the liquid 14 into the chamber 12.

It will be apparent from the foregoing description that there has been provided an improved gaseous fuel generator for fuel cells which is a demand system operative in response to the fuel consumption rate of or electrical load on the cell.

While there has been illustrated and described a particular embodiment of this invention, it will be apparent to those skilled in the art that various modifications may be made without departing from the spirit and scope of the invention, and it is therefore aimed in the appended claims to cover all such changes and modifications as fall within the true spirit and scope of the invention.

What I claim as new and desire to secure by Letters Patent of the United States is:

1. A gaseous fuel generator for supplying gas to a fuel cell comprising:
 (1) a first chamber containing a liquid reactant,
 (2) a second chamber containing a reactant capable of reacting with said liquid reactant to produce a gaseous fuel for the fuel cell,
 (3) means connecting said first and second chambers to provide a conduit for the flow of said liquid reactant from said first chamber to said second chamber,
 (4) means responsive to the fuel consumtion rate and pressure of said fuel cell for providing a self-pressurized periodic flow of said liquid reactant to said second chamber for producing said fuel, after initial pressure is established, said means being in fluid flow relationship with said second chamber, and
 (5) external feedback means connected between said first chamber and said second chamber for preventing an excessive pressure differential between said chambers,
   (*a*) means preventing fluid flow through said feedback means from said second chamber to said first chamber.

2. The generator of claim 1 wherein said external feedback means includes an atmospheric vent.

3. The generator of claim 1 having means for storing the gas generator in said second chamber, said storage means being in fluid flow relationship with said fuel cell through said pressure responsive means and being connected to said external feedback means.

4. A gaseous fuel generator for a fuel cell comprising:
 (1) a canister having
   (a) a first chamber containing a liquid reactant,
   (b) a second chamber containing a reactant capable of reacting with said liquid reactant to produce a gaseous fuel for the cell.
   (c) a partition separating said first and second chambers to enable said first chamber to be maintained at a pressure generally higher than said second chamber,
   (d) a tube passing through said partition and connecting said first and second chambers,
   (e) means connected to said tube in said second chamber for controlling the rate of escape of said liquid reactant into said second chamber, and
   (f) means within said tube for providing a resistance to the flow of said liquid reactant, thereby tending to maintain the pressure differential between said first and second chambers,
 (2) means for storing the gas generated in said second chamber, said means being in fluid flow relationship with said fuel cell,
   (a) means between said storage means and said fuel cell for maintaining a pressure within predetermined limits in said fuel cell, and
 (3) pressure responsive means in fluid flow relationship with said first chamber, said second chamber, and said storage means, to aid in maintaining a pressure differential between said first chamber and said second chamber.

5. The generator of claim 4, wherein said canister contains actuating means in said first chamber for exposing an orifice in said conduit to permit the flow of said liquid reactant therethrough.

6. The generator of claim 4, wherein said pressure responsive means includes an atmospheric vent.

References Cited in the file of this patent
UNITED STATES PATENTS

| | | |
|---|---|---|
| 2,638,920 | Woodhull | May 19, 1953 |
| 2,925,455 | Endensahn et al. | Feb. 16, 1960 |